(12) United States Patent
Allmaras et al.

(10) Patent No.: US 11,906,987 B2
(45) Date of Patent: Feb. 20, 2024

(54) PRESSURE CONTROL IN A SUPPLY GRID (71) Applicant: Siemens Aktiengesellschaft, Munich (DE)

(72) Inventors: Moritz Allmaras, Munich (DE); Jan Christoph Wehrstedt, Munich (DE); Utz Wever, Starnberg (DE)

(73) Assignee: Siemens Aktiengesellschaft, Munich (DE)

( * ) Notice: Subject to any disclaimer, the term of this patent is extended or adjusted under 35 U.S.C. 154(b) by 184 days.

(21) Appl. No.: 17/422,298

(22) PCT Filed: Feb. 18, 2020

(86) PCT No.: PCT/EP2020/054166
§ 371 (c)(1),
(2) Date: Jul. 12, 2021

(87) PCT Pub. No.: WO2020/173751
PCT Pub. Date: Sep. 3, 2020

(65) Prior Publication Data
US 2022/0083083 A1    Mar. 17, 2022

(30) Foreign Application Priority Data

Feb. 25, 2019   (EP) .................................. 19159109

(51) Int. Cl.
*E03B 7/07*       (2006.01)
*F17D 3/01*       (2006.01)
(Continued)

(52) U.S. Cl.
CPC .......... *G05D 16/208* (2013.01); *E03B 7/075* (2013.01); *F17D 3/01* (2013.01); *G05B 19/0426* (2013.01);
(Continued)

(58) Field of Classification Search
CPC ....... G05D 16/2066; E03B 7/075; F17D 3/01; G06N 3/08; G06Q 50/06; G05B 18/0426; G05B 2219/2625
See application file for complete search history.

(56) References Cited

U.S. PATENT DOCUMENTS 4,200,911 A  *  4/1980  Matsumoto ............... F17D 5/00
                                                  700/282
4,569,012 A  *  2/1986  Sekozawa ............ G05D 7/0617
                                                  700/282

(Continued)

FOREIGN PATENT DOCUMENTS

EP            3120201 A1     1/2017

OTHER PUBLICATIONS

PCT International Search Report and Written Opinion of International Searching Authority dated Jun. 2, 2020 corresponding to PCT International Application No. PCT/EP2020/054166.

*Primary Examiner* — William M McCalister
(74) *Attorney, Agent, or Firm* — Lempia Summerfield Katz LLC (57) ABSTRACT

Methods, devices, and assemblies for controlling pressure in a supply grid are provided. The supply grid is suitable for supplying fluid to loads. The supply grid has first sensors for measuring the flow and/or the pressure of the fluid at first locations in the supply grid and a pump for pumping the fluid or a valve for controlling the flow of the fluid. The method includes: measuring the flow and/or pressure of the fluid at the first locations in the supply grid by the first sensors; predicting the pressure at the second location in the supply grid using a self-learning system based on the measured flows or pressures, wherein the self-learning system is trained to predict the pressure at a specified location in the supply grid; and actuating the pump or the valve at (Continued)

least also based on the pressure predicted by the trained system at the second location.

14 Claims, 2 Drawing Sheets

(51) Int. Cl.
    *G06N 3/08* (2023.01)
    *G06Q 50/06* (2012.01)
    *G05B 19/042* (2006.01)
    *G05D 16/20* (2006.01)

(52) U.S. Cl.
    CPC ............... *G06N 3/08* (2013.01); *G06Q 50/06* (2013.01); *G05B 2219/2625* (2013.01); *G05B 2219/37371* (2013.01)

(56) References Cited

U.S. PATENT DOCUMENTS

| | | | | |
|---|---|---|---|---|
| 5,448,476 | A * | 9/1995 | Kurokawa | G06Q 10/06 706/914 |
| 6,112,137 | A * | 8/2000 | McCarty | G05D 16/2093 700/47 |
| 6,697,713 | B2 * | 2/2004 | Megan | G05D 16/20 137/119.03 |
| 6,701,223 | B1 * | 3/2004 | Rachford, Jr | G05B 13/021 700/304 |
| 7,437,267 | B2 * | 10/2008 | Oka | G06Q 10/06 702/179 |
| 7,720,575 | B2 * | 5/2010 | Ferber | G05D 7/0647 700/282 |
| 7,814,936 | B2 * | 10/2010 | Catron | G05D 7/0635 137/487.5 |
| 7,920,983 | B1 * | 4/2011 | Peleg | G06Q 10/06 702/50 |
| 9,863,425 | B2 * | 1/2018 | Kallesoe | E03B 7/075 |
| 11,054,295 | B2 * | 7/2021 | Heizenroeder | E03B 7/071 |
| 11,078,650 | B2 * | 8/2021 | Stoianov | E03B 7/02 |
| 11,243,512 | B2 * | 2/2022 | Kallesøe | F04B 49/065 |
| 11,454,009 | B2 * | 9/2022 | Kallesøe | E03B 1/02 |
| 2005/0190074 | A1 * | 9/2005 | Cumeralto | G06Q 50/06 340/870.02 |
| 2007/0130093 | A1 * | 6/2007 | Haji-Valizadeh | G06Q 50/06 705/413 |
| 2008/0300803 | A1 | 12/2008 | Drake et al. | |
| 2010/0168927 | A1 * | 7/2010 | Burrows | G05D 16/163 700/282 |
| 2011/0290331 | A1 * | 12/2011 | Burrows | E03B 7/02 137/551 |
| 2013/0032217 | A1 * | 2/2013 | Pesek | G01F 25/10 137/386 |
| 2017/0037604 | A1 | 2/2017 | Allmaras et al. | |
| 2018/0149580 | A1 * | 5/2018 | Vasan | G01N 19/08 |
| 2019/0024350 | A1 * | 1/2019 | Silverstein | G01S 13/88 |
| 2020/0080878 | A1 * | 3/2020 | Banerjee | E03B 7/12 |
| 2021/0080914 | A1 * | 3/2021 | Gaffoor | G06N 5/04 |
| 2022/0083083 | A1 * | 3/2022 | Allmaras | G06N 3/08 |

* cited by examiner

PRESSURE CONTROL IN A SUPPLY GRID

The present patent document is a § 371 nationalization of PCT Application Serial No. PCT/EP2020/054166, filed Feb. 18, 2020, designating the United States, which is hereby incorporated by reference, and this patent document also claims the benefit of European Patent Application No. 19159109.8, filed Feb. 25, 2019, which is also hereby incorporated by reference.

TECHNICAL FIELD

The disclosure relates to a method for controlling pressure in a supply grid. Typical applications are pressure control in a drinking or water or waste-water grid, or in a gas or district heating supply grid.

Although the present disclosure is described below with regard to water supply grids, it is also applicable to other supply grids, such as gas supply networks or district heating supply networks.

BACKGROUND

The hydraulic pressure prevailing in a water supply grid is an important quality indicator. For large-scale industrial consumers and fire hydrants, a high pressure provides that a large amount of water may be extracted from the supply grid in a short time. For domestic connections a sufficiently high water pressure allows entire buildings up to the top floor to reliably supply drinking water without additional pumping equipment.

On the other hand, too high a pressure in the supply grid leads to premature aging and failure of components, for example, due to pipe breakage. The resulting leaks lead to high repair costs, water losses, and in some cases further damage to surrounding structures. In addition, an excess pressure leads to increased water loss due to background leaks. Such background leaks may be present to a certain extent in every water supply grid and result in a continuous loss of drinking water. Too high residual pressure also increases the friction losses that occur during the pipe flow. In supply grids where pressure is built up by pumps, an increase in the pressure provided leads directly to an increased energy demand by the pumps.

Supply grid operators are therefore faced with the challenge of finding a compromise between the two conflicting requirements mentioned above with regard to the hydraulic pressure provided in the supply grid. This decision is made more difficult by the fact that the prevailing pressure in operation is strongly influenced by the consumption load, which may be subject to large fluctuations and may not be reliably measured or predicted. These fluctuations in consumption and switching operations of pumps and valves may also lead to short-term pressure peaks in the supply grid, which may have a harmful effect on grid components and may be a cause of sudden leaks.

In many water supply grids nowadays, a continuous high pressure is provided by water towers or continuously running pumps. The design of the grid components is deliberately over-dimensioned at the planning stage. The excess pressure in the supply grid is reduced to a practical level for consumers by pressure reduction devices at the consumption points. The disadvantages listed above due to long-term operation at high pressure may be simply tolerated.

Only in the recent past have approaches been developed under the heading "pressure management", to adapt the pressure prevailing in the water distribution grid to the requirements of the consumers in a targeted manner, thereby avoiding excessive pressures and the associated disadvantages. Among the techniques developed is the division of the supply grid into pressure management zones (PMZ), in which the pressure at the inlets is reduced to a minimum by selective control of valves or pumps. The design of the pressure control system uses knowledge of the grid structure, the topographical characteristics of the pressure zone, and the number and type of the connected consumers. In order to be able to respond to the dynamic pressure fluctuations caused by changing consumption, online measured pressure values in the zone are now also being used for pressure control.

The European patent application EP 3 120 201 discloses a method for controlling pressure in a supply grid. A central component of this method is the creation of a simulation model of the supply grid. The simulation model simulates pressure and/or flow profiles as a function of consumption profiles. The data describing the pressure and/or flow profiles are then reduced. All this may be carried out "offline", (e.g., outside the actual operation), in particular before the supply grid is put into operation. In an "online" part of the method, (e.g., in the operation of the supply grid), a first pressure and/or flow rate value is measured at at least one first position in the supply grid by at least one first sensor. However, in order to also determine a second pressure and/or flow rate value at at least one second position in the supply grid, this value is reconstructed from the reduced data and by using the at least one first pressure and/or flow rate value. The reduced data may contain less data and/or lower data complexity than the (non-reduced) data. The use of the reduced data for the determination of the second pressure and/or flow rate values has the advantage that less computing power is required, thus enabling a rapid actuation of the at least one pump or the at least one valve, in particular in real time.

In some cases, however, the creation of such a simulation model is relatively time-consuming, (e.g., in the case of a complex routing of the supply grid pipelines), or if there is simply insufficient information available regarding the topology of the supply grid and the consumers connected to the supply grid. In other cases, it is indeed possible to set up a corresponding simulation model and reduce the data. Nevertheless, the reconstructions of the second pressure or flow rate value may take longer than is desirable for the actuation of the pump and/or valve, despite the reduction of the data from the simulation model.

SUMMARY AND DESCRIPTION

Against this background, one object of the present disclosure is to provide an alternative approach to pressure control in a supply grid, which in particular enables rapid actuation of the pump and/or valve.

The scope of the present disclosure is defined solely by the appended claims and is not affected to any degree by the statements within this summary. The present embodiments may obviate one or more of the drawbacks or limitations in the related art.

Accordingly, a method for controlling pressure in a supply grid is provided. The supply grid is suitable for and designed to supply consumers with a fluid. The supply grid has first sensors for measuring the flow rates and/or pressures of the fluid at first locations in the supply grid. In addition, the supply plant includes a pump for pumping the fluid, or a valve for controlling a flow of the fluid. The method for controlling pressure includes: a) measuring the flow rates and/or pressures of the fluid at the first locations in the supply grid using the first sensors, b) predicting the pressure at the second location in the supply grid using a self-learning system based on the flow rates or pressures measured in act a), wherein the self-learning system has been trained to predict the pressure at a given location in the supply grid, and c) actuating the pump or valve based also at least on the pressure at the second location predicted by the trained system.

The inventors have recognized that a self-learning system may be used in an advantageous way for controlling pressure in a supply grid. In a first phase, the self-learning system is trained to predict the pressure at a specified location in the supply grid. After the training phase, the trained system is used during the operation of the supply grid. For this purpose, the trained system predicts the pressure at a specific location in the supply grid based on the actual flow rates and/or pressures measured during operation. The idea is that the predicted value will correctly indicate the actual pressure. Thus, due to the prediction of the trained system, in particular, no measurement of the flow rate and/or pressure at the second location is necessary in order to know the pressure at the second location (assuming the prediction of the trained system is correct).

This results in several advantages. A first advantage is that it is possible to know the pressure at locations in the supply grid where no sensor is positioned and for which no measurement in these locations is necessary to acquire this knowledge. It may in some circumstances be advantageous to measure the pressure and/or the flow rate at the corresponding "second" location during the training of the self-learning system, as will be described in detail later. However, there are also alternatives to this, in case the second location is difficult or impossible to access for a direct measurement, for example. In any case, no sensor is required at the second location for the pressure control itself, as the pressure at the location there is predicted using the trained system.

A second advantage of the method is that the pressure at the second location may be determined quickly. In contrast, for example, to an analytical or model-based simulation of the supply grid, which already becomes very computationally intensive and thus time-consuming very rapidly even with a low-complexity topology of the supply grid and a small number of consumers, a trained system is characterized by, among other things, the fact that for the input data entered, (e.g., the measured flow rates and/or pressures of the first sensors), the required output, (e.g., the pressure at the second location), may be output very quickly. Thus, the pressure at the second location is also available virtually "online" and without a time delay after the flow rates and/or pressures at the first locations have been measured. This is of considerable relevance to a control method such as the present method for controlling the pressure in a supply grid.

A prediction of the pressure may be possible for the location for which the self-learning system has also been trained. However, it is possible to train the self-learning system for predicting the pressure at more than one location on the supply grid. The number of measuring points in the grid does not necessarily have to be greater than the number of locations for which the pressures are predicted, but this may be the case.

The described method may be applied to any type of supply grid in which a pressure of a fluid is to be controlled. A fluid is understood to mean any kind of liquid or gas. In the case that the fluid is water, the supply grid is, in particular, a drinking water supply grid or sewage system. In the case that the fluid is, for example, natural gas, the supply grid is, in particular, a gas supply grid. In the case that the supply grid is a district heating supply grid, the transfer medium, (e.g., the fluid), may be hot water or steam.

In particular, the supply grid includes a number of pipes, also referred to as pipelines or simply as lines. The pipes are there to convey the fluid to the consumers, and in some cases away from them again. The pipes are designed so that the fluid flows through them.

In the context of this patent application, the flow rate at a specific location in the supply grid means the volume of the fluid flowing through the cross-section of the pipe at the corresponding location per given time period. The cross-section of the pipe is determined by its inner diameter. The flow rate is also referred to as "volume flow" or "volumetric flow rate". It has the SI unit $m^3/h$. In the context of this patent application, the flow rate therefore means a value that characterizes and quantifies the flow rate. It may consequently also be referred to as the "flow rate value".

The flow rate is measured by flow meters. A flow meter may include two main components: the actual measurement sensor, which acts as a flow rate sensor, and an evaluation and supply part, also referred to as a transmitter or transducer. The flow meters are also referred to as "sensors" in the context of this patent application.

In the case that the fluid in the supply grid is a liquid, within the context of this patent application the pressure at a specific location in the supply grid is understood to mean the hydrodynamic pressure of the fluid at that location. The hydrodynamic pressure is not directly measurable, but in the case of loss-less, horizontal, and stationary flow, it may be determined by measuring the difference between total pressure and static pressure, for example, with a Prandtl probe which is a combination of a pitot tube and a static pressure probe. In the case of a liquid, the measurement of the pressure of the fluid is defined in particular as the indirect determination of the pressure by a Prandtl probe.

In the case that the fluid in the supply grid is a gas or gas mixture, the pressure is defined as the resultant force which is given by the sum of all forces acting in all directions due to the gas or gas mixture. Thus, analogous to the hydrodynamic pressure of a flowing fluid, it is also the pressure of the flowing gas in the flow direction that is also relevant here.

If the hydrodynamic pressure of a fluid at a point is known, it may be used to calculate the velocity of the fluid and hence the flow rate. Conversely, the (relative) pressure at any location may be calculated from a known flow rate at that location. If the absolute pressure at a location in the supply grid is also known, the relative pressure may be converted into an absolute pressure at any location in the supply grid.

Consequently, the self-learning system may be trained with measured flow rates at the first locations as well as with measured pressures. However, it is advantageous if at least one of the first sensors actually measures an absolute pressure, because the self-learning system may then also determine an absolute pressure for the second location. Likewise, it is advantageous for the operation of the supply grid, (e.g., after the completion of the learning phase of the self-learning system), if at least one of the first sensors actually measures an absolute pressure, because (only) then may the trained system predict an absolute pressure for the second location.

The self-learning system may be implemented as an artificial neural network. It has artificial neurons that are located on one or more layers and are connected to one another. An artificial neuron may process multiple inputs and respond accordingly via its activation. To this end, the inputs are weighted and passed to an output function that calculates the neuron activation. The weights are continuously adjusted during the learning phase of the self-learning system until the output for a given input matches a target value as accurately as possible.

The person skilled in the art will know how to configure a suitable self-learning system. An example of a suitable programming framework is TensorFlow. TensorFlow is a programming framework for data-stream oriented programming. It is used from Python programs, for example, and is implemented in Python and C++. TensorFlow is popular in the field of machine learning, in particular for self-learning systems. TensorFlow was originally developed by the Google Brain team for Google's internal needs and later released under the Apache 2.0 open-source license. In research and production, TensorFlow is currently used by various teams in commercial Google products such as speech recognition, Gmail, Google Photos, and Google Search. The mapping service Google Maps is also improved by analyzing the photos taken by Street View, which are analyzed using artificial intelligence based on TensorFlow. Many of these products previously used the predecessor software DistBelief.

The training of the self-learning system includes the following acts.

In act i), the respective pressure is measured at a plurality of first locations in the supply network by first sensors, one of which may be located at each first location (also: measuring site). Alternatively, or additionally, as described above, the flow rate may also be measured. The set of measured pressures and/or flow rates at the various first locations forms the input data for the self-learning system.

In act ii), the self-learning system, (e.g., the artificial neural network), determines an output value based on the input data collected in act i). The output value in the present case is the actual pressure at the corresponding location, the so-called second location.

In act iii), the pressure determined at the second location by the self-learning system is compared to a target value and in act iv) the self-learning system is adjusted taking into account the comparison performed in the previous act. The learning method by which the self-learning system is taught (or: trained) to correctly predict the pressure at a specific location is implemented as a supervised learning procedure. In supervised learning, an input pattern is fed into the artificial neural network and the output produced by the neural network in its current state is compared with the value that it is actually supposed to output. By comparing the desired and actual outputs, it is possible to derive the changes to be made to the network configuration. For single-layer neural networks, the delta rule (also known as the perceptron learning rule) may be applied. Multi-layer neural networks may be trained using error back-propagation, which is a generalization of the delta rule.

In a first alternative, the target value is based on a flow rate and/or pressure that is actually measured at the location where the self-learning system has to predict the pressure. In other words, the pressure at the second location predicted by the self-learning system is compared with the actual pressure measured with or obtained from a corresponding sensor.

This choice of target value has the advantage that the target value may be obtained quickly and accurately. The target value is available quickly, as this only requires a measurement of the flow rate and/or pressure with a corresponding sensor. Depending on the quality of the sensor, the target value measured using a sensor is highly precise, as it is measured directly, and any sources of error are therefore minimal.

In a second alternative, the target value is not measured directly, but determined by a simulation. The pressure at a certain location predicted by the self-learning system is thus compared with a pressure calculated by a simulation at the same location. The key condition for the success of the learning phase and, above all, for the trained system to be successfully used in operation, is the quality of the simulation. Because the pressures calculated by the simulation are used as target values during the training of the self-learning system, the simulated pressures may reflect the reality with high reliability and precision. In other words, it is safe to assume that the simulation is capable of accurately calculating the actual pressure value for a wide range of input data.

The advantage of an analytically or model-based calculated target value is that no sensor or flow rate or pressure measurement is required at the corresponding location during the learning phase. Because no measurement is required at the corresponding (second) location even during the operation of the supply grid, it is therefore possible to dispense with the placement and use of a sensor at the second location when simulating the target value.

If the fluid is water, the simulation is also referred to as a hydraulic simulation.

The more numerous and accurate the input, (e.g., the input data), the more accurate the simulation may be. For a supply grid, for example, the topology of the grid may be used as input data. This refers to the arrangement and composition of the pipes, including the placement of the nodes at which three or more pipes meet. Other input data required are the locations where consumers connected to the supply grid are placed, as well as the nature of the consumers. Other input data required, or at least of great benefit, for an accurate simulation are properties of the pipes, such as their diameters or their flow resistances. Finally, some kind of equivalent consumption profiles are needed for the different types of consumers. Because for practical and data protection reasons the actual consumption of the consumers cannot be used as input, representative consumption patterns, so-called equivalent consumption profiles, may be used as the basis for the simulation. For example, an equivalent consumption profile may be used for each of a single-family house, a multiple-family house (with details of the housing units), small business, hospital, etc.

Advantageously, the target values for the corresponding input data are made available very quickly during the learning phase, as this may minimize the duration of the learning phase. For this purpose, it may be advantageous to reduce the input data of the simulation before determining the target value. This may be implemented, for example, by a series expansion. The person skilled in the art will be familiar with the relevant techniques and procedures; purely as an example, principal component analysis is mentioned in this context.

If the topology of the network changes to a significant extent, for example, due to significant changes in the consumers or due to changes in the installed pipes, the self-learning system is re-trained. However, the self-learning system may be pre-assigned with the parameters, (e.g., weights), of the previously trained system, so that only a relatively rapid and straightforward update of the parameters, (e.g., a shortened learning phase), may be necessary.

Returning to the method of training the self-learning system: acts i) to iv) mentioned are repeated until a specified termination criterion is reached. The termination criterion may be that the difference between the pressure determined by the self-learning system at a certain location and the "true" pressure at that location, (e.g., the target value), is below a specified threshold value. In other words, the two values may be the same or only slightly different. In order to provide that the self-learning system is robust and reliably predicts the true flow rate at the corresponding location over a wide range of input data, the termination criterion may also include the condition that the average value over a predetermined number of iterations may be below the specified threshold value for the difference.

If the termination criterion is met, the self-learning system is not changed any further. In the case of an artificial neural network, for example, the weights on the artificial neurons are not further adjusted but kept constant.

The training phase is followed by the operation of the trained system, which may also be called the utilization phase.

In act a) of the utilization phase, the flow rates and/or pressures of the fluid through the pipes are measured at the first locations in the supply grid. This takes place at the same locations as during the training phase. The reason for this is that a trained system has been trained for flow rates or pressures measured at the first locations, so that it may only be used with input data from these first locations in the utilization phase also. Bluntly speaking, a self-learning network cannot normally be trained to recognize apples but then used to recognize pears.

It is advantageous that the flow rates and/or pressures during operation are determined using the same first sensors that were used to feed the self-learning system with input data during the training phase.

In act b), the trained system predicts the pressure at the second location based on the flow rates and/or pressures actually measured at the first locations. If the self-learning system has been thoroughly and comprehensively trained during the learning phase, there is a reasonable expectation that the predicted pressure for the second place will match the reality.

In act c), the pump or the valve is actuated based at least on the pressure at the second location predicted by the trained system. With the knowledge of the pressure at the second location, the pressure in the supply grid may now be optimized. As mentioned earlier in the description, the pressure in conventional supply grids may not be optimal. In practice, it tends to be chosen too high and the disadvantages mentioned earlier, (e.g., high material wear, high background leakages, high energy consumption of the pumps, etc.), are tolerated. With the method, the pressure may be controlled more efficiently. The pump or valve may be controlled exactly in such a way that it delivers as much pressure as necessary, but as little pressure as possible. This may be achieved by the method presented without having to measure the pressure continuously at all locations in the supply grid, in particular, those that are difficult to access.

The first sensors are advantageously placed in the supply grid in such a way that their measurement values are not correlated with one another. Although it may not be a disadvantage in itself if the measured flow rates and/or pressure values of a first sensor correlate with the flow rates and/or pressure values of another first sensor in the supply grid, the maximum effectiveness is achieved by the sensors if their measured values are not correlated with one another. There is no general rule for avoiding a correlation between two adjacent sensors. In fact, the person skilled in the art will choose the placement of the first sensors advantageously in a specific case such that they do not correlate with one another.

In one embodiment, not only is a single "second location" in the supply grid controlled with regard to optimum pressure regulation, but the method is carried out for a plurality of second locations. For this purpose, it is again important that the self-learning network is trained already in the training phase for the plurality of second locations. Only then may the trained network reliably predict the respective pressures at the plurality of second locations during operation.

In another embodiment, the supply grid includes n+m sensors, namely n first sensors and m second sensors. In a first part of the method, the self-learning system with the first n sensors is trained in such a way that it correctly predicts the pressures at the m second sensors. In a second part of the method the self-learning system is then trained, based on measured flow rates and/or pressures of the m sensors, which now act as first sensors, to predict the pressures of the n second sensors operating at second locations. This concludes the learning phase, and the utilization phase follows. Here, the pressures at the m locations of the m second sensors are first predicted. The roles are then reversed, e.g., the n formerly first sensors now act as second sensors, and the pressures are predicted at the n locations of the n now second sensors.

One advantage of this method is that the respective pressures may be predicted at more locations of the supply grid. The supply grid may include other sensors apart from the n+m sensors mentioned, which act as first sensors in both learning phases and thus make the self-learning system more robust.

The disclosure relates not only to a method for controlling pressure in a supply grid, but also to a corresponding apparatus. In particular, the disclosure relates to an apparatus for controlling pressure in a supply grid, wherein the supply grid is suitable for supplying consumers with a fluid. The supply grid includes first sensors for measuring the flow rates and/or the pressures of the fluid at first locations in the supply grid, and a pump for pumping the fluid, or a valve for controlling a flow of the fluid. The pressure control apparatus includes: a self-learning system that has been trained to predict the pressure at a predetermined location in the supply grid; a first detection unit for detecting the fluid flow rates or pressures measured by the first sensors at the first locations in the supply grid; a prediction unit for predicting the pressure at the second location using the trained system based on the flow rates or pressures detected at the first location by the first detection unit; and an actuation unit for actuating the pump or valve.

Specific designs and variations of the disclosure which have been described in connection with the method for controlling pressure may be transferred to the said apparatus accordingly.

Finally, the disclosure also relates to an arrangement including: a supply grid, which is suitable for supplying consumers with a fluid; first sensors for measuring the flow rates and/or the pressures of the fluid at first locations in the supply grid; a pump for pumping the fluid or a valve for controlling a flow of the fluid; and an apparatus for controlling pressure in the supply grid as described above.

BRIEF DESCRIPTION OF THE DRAWINGS

Hereafter, the disclosure is described based on exemplary embodiments and with reference to the appended drawings, in which.

DETAILED DESCRIPTION

Figure 1:
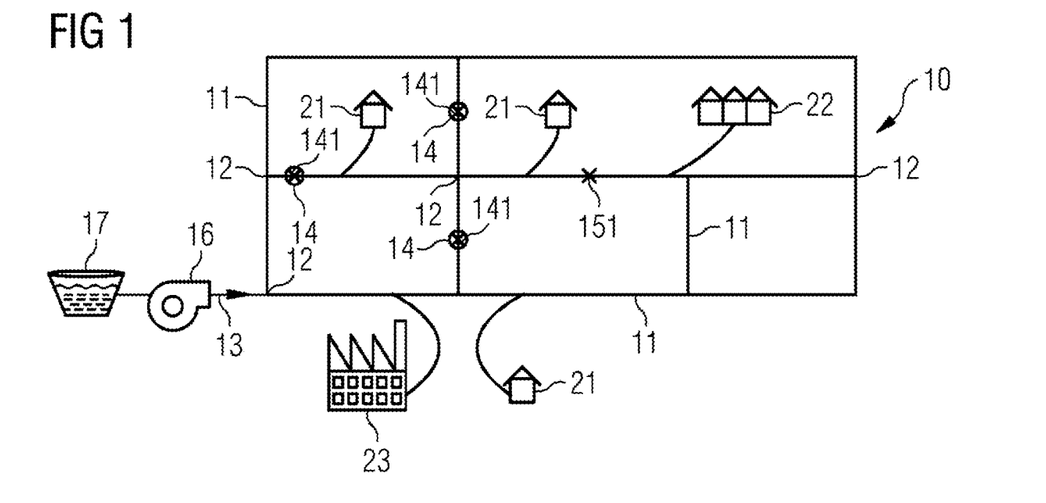
FIG. 1 depicts an example of a supply grid connected to a plurality of different consumers.

FIG. 1 illustrates schematically an example of a supply grid 10 for supplying a series of consumers with drinking water. It is therefore a drinking water supply grid. Of course, the disclosure is not limited to drinking water supply grids but is also applicable to other types of supply grids.

FIG. 1 shows a measuring district, in the technical jargon usually termed a "District Metering Area (DMA)", which is part of a higher-level drinking water supply grid. The measuring district shown may also be termed a pressure management zone (PMZ), because in this zone the pressure is to be controlled by the present disclosure in an advantageous way. The supply grid 10 shown in FIG. 1 includes a single inflow 13 and no outflows. The supply grid 10 includes a number of pipes 11, wherein three or four pipes 11 meet at each of a plurality of nodes 12 of the supply grid 10. For clarity, not all of the existing pipes 11 and nodes 12 are referenced with reference signs in FIG. 1.

In the inflow 13, there is a pump 16 which pumps the water from a water reservoir 17 into the supply grid 10. Alternatively, instead of the pump, a valve may be provided, which controls the inflow of water into the supply grid 10. A valve instead of a pump may be sufficient, for example, when the water reservoir 17 is located at such a height relative to the consumers connected to the supply grid 10 that the water flows through the inflow 13 under so much pressure that the inflow only regulates, but the water no longer needs to be pumped into the supply grid 10.

FIG. 1 also shows examples of several consumers connected to the drinking water supply grid 10. The consumers are divided into different categories; in FIG. 1, a plurality of single-family houses 21, a multiple-family house 22, and a factory 23 are shown as examples. In reality, at least several dozen, (e.g., several hundred), and sometimes several thousand consumers may be connected to a supply grid in a DMA. For the sake of clarity, only very few examples of consumers connected to the supply grid 10 are shown in FIG. 1.

In FIG. 1, therefore, the topology of the supply grid 10, in particular the number and branches of the pipes 11, as well as the number and type of the consumers connected to the supply grid 10, are shown in a highly simplified way to illustrate the disclosure.

The supply grid 10 shown has no (explicit) outflows. Nevertheless, an outflow of drinking water from the supply grid 10 takes place via the consumers. However, for practical and data protection reasons, the exact consumption rates of the respective consumers are not known.

The supply grid 10 also includes three first sensors 14. These first sensors 14 are designed as flow-rate or pressure meters and may measure the flow rate or pressure of the drinking water through the pipes 11 at the respective locations in the supply grid 10 where the first sensors 14 are located. The locations at which the first sensors 14 are located and for which the respective flow rate or pressure is measured are designated as first locations 141.

The object of the disclosure is then to optimally control the pressure in the supply grid 10 during the operation of the supply grid 10. The correct prediction of the instantaneous pressure at a second location 151 in the supply grid 10 plays an important role here.

Figure 2:
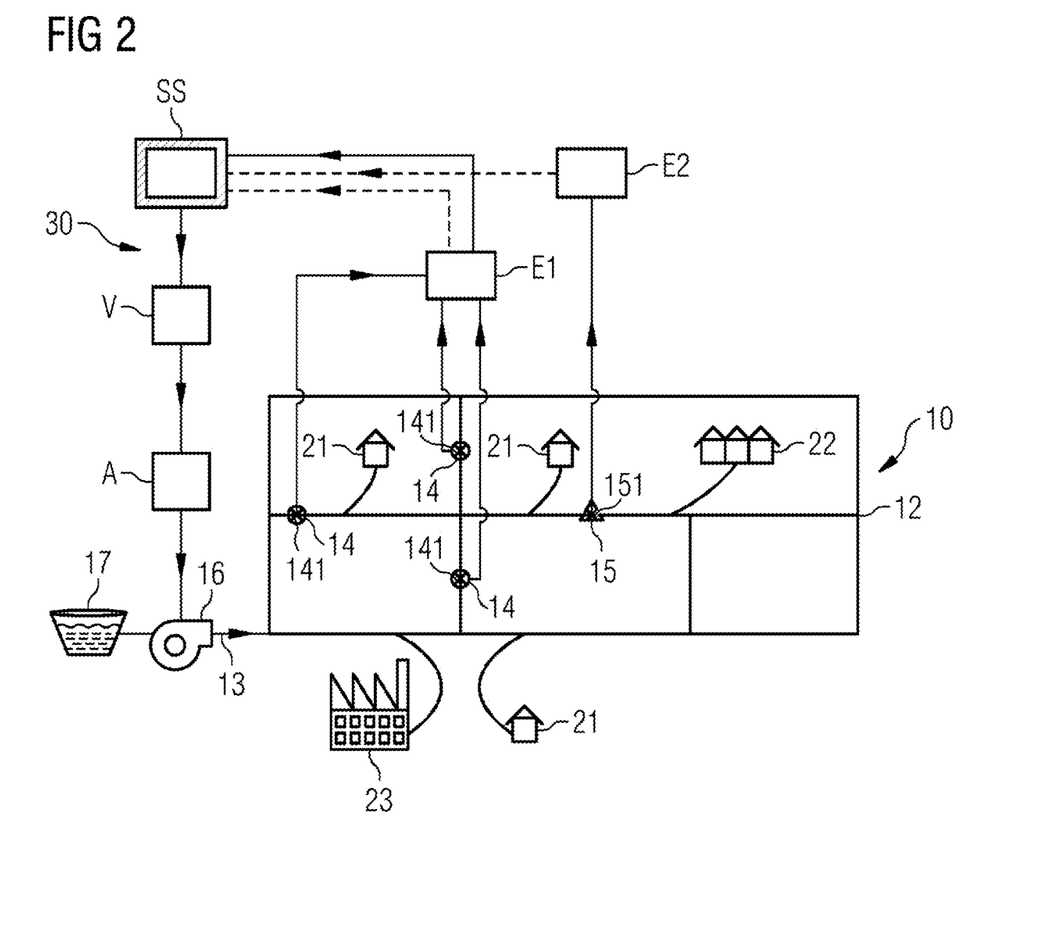
FIG. 2 depicts a first exemplary embodiment of an apparatus for controlling pressure in a supply grid.
Figure 3:
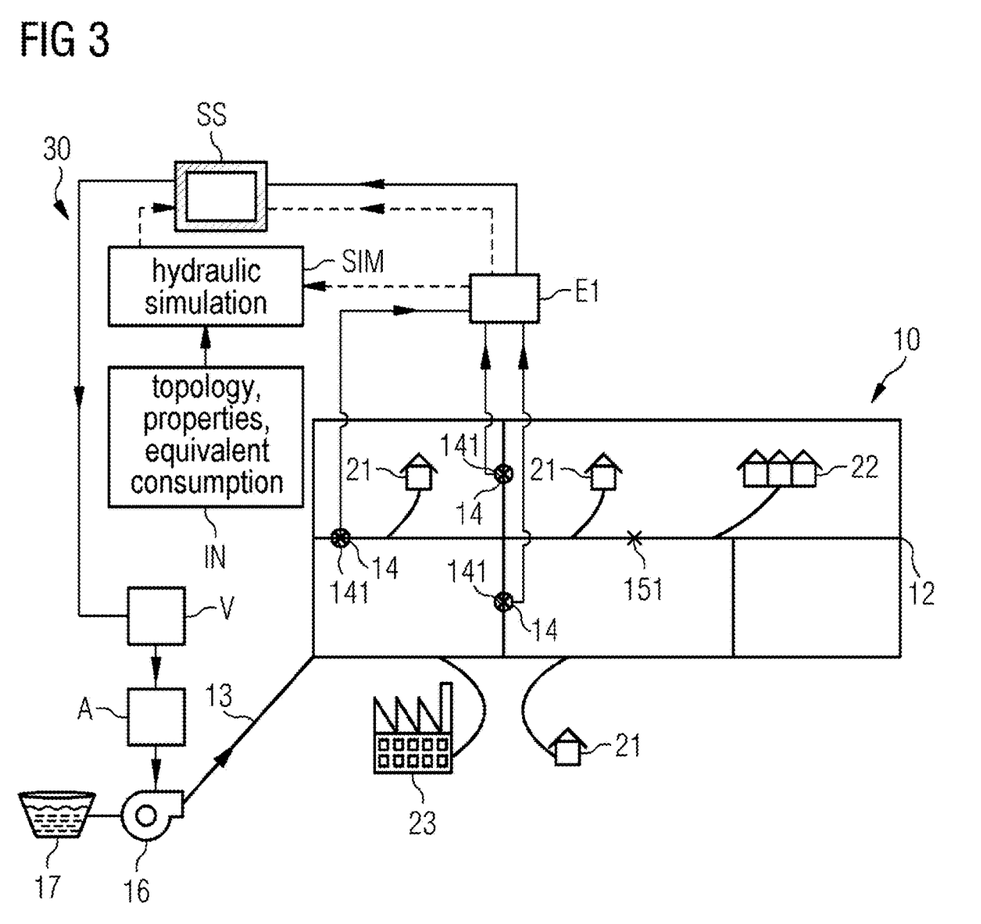
FIG. 3 depicts a second exemplary embodiment of an apparatus for controlling pressure in a supply grid.

For this purpose, the disclosure makes use of a corresponding apparatus 30. A first exemplary embodiment of such an apparatus 30 for pressure control in a supply grid 10 is shown in FIG. 2. By contrast, FIG. 3 shows a slightly modified exemplary embodiment of such an apparatus 30. The two exemplary embodiments differ in the use of a different target value during the training of the self-learning system SS.

Firstly, FIG. 2 shows the same supply grid 10 as that in FIG. 1. In order to avoid repetition, reference is made to FIG. 1 for the description of the supply grid 10 and the consumers connected to it.

FIG. 2 also shows, in addition to the supply grid 10 and the connected consumers, an apparatus 30 for pressure control of the drinking water in the supply grid 10. For this purpose, the first three sensors 14 are connected to a first detection unit E1. The first detection unit E1 is designed to detect and transmit the flow rates and/or pressures measured by the first sensors 14 at the first locations 141. FIG. 2 also shows a second detection unit E2. This is designed, analogously to the first detection unit E1, to detect the flow rate and/or pressure measured by a second sensor 15 at the second location 151 in the supply grid 10 and, as soon as required in the process, to transmit it to an appropriate point.

During the training phase, in the first exemplary embodiment shown in FIG. 2, the self-learning system SS is connected to the first detection unit E1 and the second detection unit E2. These connections are indicated in FIG. 1 as dashed lines. The first detection unit E1 supplies the input data, namely the measured flow rates and/or pressures at the first locations 141 in the supply grid 10. Based on this, the task of the self-learning SS system is to predict or determine an (expected) pressure at another location in the supply grid. This other location is the second location 151 mentioned above, namely the location where the second sensor 15 is located. At the beginning of the training phase, the pressure determined at the second location 151 by the self-learning system SS will not normally match the actual pressure at that location. In order to train the self-learning system SS, (e.g., to correct it), the concept of supervised learning is applied. For this purpose, the pressure determined by the self-learning system SS is compared with a target value. This target value in the present exemplary embodiment is the actual flow rate and/or pressure measured at the second location. The flow rate and/or pressure at this location is advantageously measured with the second sensor 15.

If a flow rate is measured by the second sensor 15, the value is converted into a pressure. If a pressure is measured by the second sensor 15, this measured pressure may be used directly.

The pressure calculated or measured by the second sensor 15 is detected by the second detection unit E2 and forwarded to the self-learning system SS. The pressure measured or calculated by the second sensor 15 is then compared with the previously determined/predicted value in the self-learning system. If the agreement is too low, (which, as indicated above, is likely to be the case in particular at the beginning of the training), new flow rate and or pressure values are measured by the first sensors 14. For these new flow rates and/or pressures, the self-learning system SS attempts to predict the actual pressure at the second location 151 as accurately as possible.

It is advantageous if the values measured by the first sensors 14 in the second iteration differ from the values measured in the first iteration. If the measured values at the first locations 141 are very similar or even identical, the self-learning system SS will correctly predict the pressure at the second location 151 in the second iteration without difficulty based on the learned results from the first iteration. In operation, however, the self-learning system SS is able to make a correct prediction for the pressure at the second location 151 for a wide range of flow rates and/or pressures at the first locations 141.

The acts described in an iteration are thus: measuring the flow rates and/or pressures at the first locations 141; predicting or determining the pressure at the second location 151; and comparing the predicted pressure with the actual measured pressure.

A sufficient number of iterations is carried out to allow the specified termination criterion to be met. The termination criterion may be that for ten consecutive iterations the difference between the pressure at the second location 151 determined by the self-learning system SS and the actual pressure present (e.g., determined on the basis of the measurement of the second sensor 15 located at the second location 151) in each case is less than 5%, less than 2%, or less than 1%.

It is advantageous to combine this given exemplary termination criterion with a further condition, for example, that for ten consecutive iterations the flow rates and/or pressures measured at the first locations 141 cover a wide range of values. This means, for example, that there is a difference of at least 100% between the smallest measured pressure of each first sensor 14 and the largest measured pressure of the same first sensor 14. Of course, more complex conditions are also conceivable to provide a wide coverage of the first flow rates and/or pressures in different iterations.

The training phase is followed by the operation, also known as the utilization phase, of the supply grid 10. In this case, the flow rates and/or pressures at the first locations 141 are again measured in the supply grid 10. This is carried out using the first sensors 14. The measured values are detected by the first detection unit E1 and transmitted to the self-learning system SS, which after the end of the learning phase is also referred to as the "trained system" SS within this patent application. The transmission of the flow rates and/or pressures detected by the first detection unit E1 to the trained system SS is indicated in FIG. 1 with a solid line to distinguish it from the dashed connection during the training phase.

The trained system SS now makes a prediction for the expected pressure at the second location 151 in the supply grid 10 based on the measured flow rates and/or pressures at the first locations 141. This prediction is made by a prediction unit V.

Based on the predicted pressure at the second location 151 in the supply grid 10, the pump 16 is then actuated accordingly. If it turns out, for example, that the pressure at the second location 151 is higher than it may be for supplying the relevant consumers with drinking water, the pump 16 reduces its pumping capacity. This reduces the pressure in the supply grid 10 and in particular at the second location 151, thereby reducing the wear on the components of the supply grid 10, the energy consumption of the pump 16, and any background leakages in the supply grid 10. On the other hand, if it turns out, for example, that the pressure at the second location 151 is lower than is necessary for fire hydrants located in the vicinity of the second location 151, the pump 16 increases its pumping capacity. This will provide a water pressure at the second location 151 that is high enough for the relevant requirements in case water needs to be extracted from a fire hydrant located in this vicinity.

If the respective pressures are predicted for a plurality of second locations in 151, the pressure in the supply grid 10 may be controlled even more optimally.

FIG. 3 shows a second exemplary embodiment of an apparatus 30 for controlling the pressure in a supply grid 10. It differs from the apparatus 30 of the first exemplary embodiment in the training of the self-learning system SS.

In concrete terms, during the training phase in the second exemplary embodiment, only the flow rates and/or pressures measured at the first locations 141 are transmitted from the first detection unit E1 to the self-learning system SS. This in turn says or determines an expected pressure at the second location 151 in the supply grid 10. However, in act iii) of the method, this expected pressure is not compared directly with the pressure determined at the second location 151, but with a simulated pressure at the second location 151. It is very important for successful training of the self-learning system SS that the simulated flow rate at the second location 151 is trustworthy, (e.g., correct), because it represents the target value with which the self-learning system SS is trained. If the target value does not match the reality, then logically the trained SS system cannot correctly model or predict the reality either.

In the present case of a drinking water supply grid, the simulation SIM is a hydraulic simulation. For this purpose, the pressures and other parameters (e.g., flow rates, flow velocities, etc.) in the supply grid are simulated analytically or using model-based methods based on fluid mechanics. The challenge of a hydraulic simulation SIM may be the fact that it quickly becomes quite complex even for topologically relatively simple supply grids. In addition, a series of input data IN may be required for the hydraulic simulation SIM. These include: the topology, (e.g., the layout and routing of the pipes 11 and nodes 12); the flow rate and/or pressure at the inflow 13 into the supply grid 10; the arrangement and nature of the consumers; equivalent consumption profiles of the individual consumer types, e.g., typical (or: representative) consumption profiles for each consumer type; properties of the pipes, such as friction coefficients or internal diameters.

Based on the measured flow rates and/or pressures at the first locations 141 and the available input data IN, the hydraulic simulation SIM simulates the expected pressure at the second location 151 and transmits it to the self-learning system SS. The simulated pressure at the second location 151 acts as a target value for the self-learning system SS and as a measure of how well the self-learning system SS has already been trained.

In the second exemplary embodiment, the utilization phase or operation of the supply grid proceeds identically to the first example, for which reason reference is made to the description of the same above.

In summary, the disclosure provides a method, an apparatus, and an arrangement with which the pressure in a supply grid may be easily controlled by a self-learning system, wherein at several places in the supply grid the pressure is not measured but merely predicted by the trained system.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling pressure in a supply grid, wherein the supply grid is configured to supply consumers with a fluid and comprises a plurality of first sensors for measuring flow rates and/or pressures of the fluid at a plurality of first locations in the supply grid, and a pump for pumping the fluid or a valve for controlling a flow of the fluid, the method comprising:
 training a self-learning system comprising:
  measuring the flow rates and/or the pressures of the fluid at the plurality of first locations in the supply grid using the first sensors;
  determining a pressure, by the self-learning system, at a second location among a plurality of second locations in the supply grid based on the flow rates and the pressures measured at the plurality of first locations;
  determining a difference between the determined pressure and a target value;
  adjusting the self-learning system taking into account the determined difference; and
  repeating the measuring, the determining of the pressure, the determining of the difference, and the adjusting of the self-learning system until a specified termination criterion is met;
 predicting a pressure at the second location among the plurality of second locations in the supply grid using the self-learning system based on the measured flow rates or the pressures of the fluid at the plurality of first locations; and
 actuating the pump or the valve based on the predicted pressure at the second location.

2. The method of claim 1, wherein the self-learning system is trained and the pressure control is performed for the plurality of second locations different from the plurality of first locations.

3. The method of claim 1, wherein the termination criterion occurs when an average difference between the determined pressure at the second location and the target value falls below a specified threshold value.

4. The method of claim 1, wherein the target value is based on an actual flow rate and/or pressure of the fluid at the second location measured by a second sensor.

5. The method of claim 4, further comprising:
 removing the second sensor from the supply grid after the training of the self-learning system.

6. The method of claim 1, wherein the target value is determined by a simulation.

7. The method of claim 6, wherein the simulation uses a topology of the supply grid, the locations and type of consumers, and an equivalent consumption profile for each consumer as input data.

8. The method of claim 7, wherein the input data is reduced prior to the determination of the target value by a series expansion.

9. The method of claim 8, wherein the series expansion is a principal component analysis.

10. The method of claim 1, further comprising:
 positioning the plurality of first sensors at the plurality of first locations in the supply grid such that measurement values of the plurality of first sensors are not correlated.

11. The method of claim 1, wherein the fluid is water, and wherein the supply grid is a drinking water supply grid or sewage system.

12. The method of claim 1, wherein the fluid is a gas, and wherein the supply grid is a gas network or district heating supply grid.

13. An apparatus for controlling pressure in a supply grid, wherein the supply grid is configured to supply consumers with a fluid and comprises a plurality of first sensors for measuring flow rates and/or pressures of the fluid at a plurality of first locations in the supply grid, and a pump for pumping the fluid or a valve for controlling a flow of the fluid, the apparatus comprising:
 a self-learning system capable of training itself by: (1) measuring the flow rates and/or the pressures of the fluid at the first locations in the supply grid using the first sensors; (2) determining a pressure, by the self-learning system, at a second location among a plurality of second locations in the supply grid based on the flow rates and the pressures measured at the plurality of first locations; (3) determining a difference between the determined pressure and a target value; (4) adjusting the self-learning system taking into account the determined difference; and (5) repeating the measuring, the determining of the pressure, the determining of the difference, and the adjusting of the self-learning system until a specified termination criterion is met;
 a first detection unit configured to detect fluid flow rates or the pressures measured by the plurality of first sensors at the plurality of first locations in the supply grid;
 a prediction unit configured to predict a pressure at the second location among the plurality of the second locations by the trained self-learning system based on the flow rates or the pressures detected at the plurality of first locations by the first detection unit; and
 an actuation unit configured to actuate the pump or the valve.

14. An arrangement comprising:
 a supply grid configured to supply consumers with a fluid;
 a plurality of first sensors configured to measure flow rates and/or pressures of the fluid at a plurality of first locations in the supply grid;
 a pump configured to pump the fluid or a valve configured to control a flow of the fluid; and
 an apparatus configured to control pressure in the supply grid, wherein the apparatus comprises:
  a self-learning system capable of training itself by: (1) measuring the flow rates and/or the pressures of the fluid at the first locations in the supply grid using the first sensors; (2) determining a pressure, by the self-learning system, at a second location among a plurality of second locations in the supply grid based on the flow rates and the pressures measured at the plurality of first locations; (3) determining a difference between the determined pressure and a target value; (4) adjusting the self-learning system taking into account the determined difference; and (5)

repeating the measuring, the determining of the pressure, the determining of the difference, and the adjusting of the self-learning system until a specified termination criterion is met;

a first detection unit configured to detect the flow rates or the pressures measured by the plurality of first sensors at the plurality of first locations in the supply grid;

a prediction unit configured to predict a pressure at the second location among the plurality of second locations by the trained self-learning system based on the flow rates or the pressures detected at the plurality of first locations by the first detection unit; and an actuation unit configured to actuate the pump or the valve.

* * * * *